(12) United States Patent
Vainish

(10) Patent No.: US 12,487,832 B2
(45) Date of Patent: Dec. 2, 2025

(54) SYSTEM AND METHOD FOR SOFTWARE STATE MANAGEMENT

(71) Applicant: Avago Technologies International Sales Pte. Limited, Singapore (SG)

(72) Inventor: Ronen Vainish, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 103 days.

(21) Appl. No.: 18/496,088

(22) Filed: Oct. 27, 2023

(65) Prior Publication Data

US 2025/0138831 A1    May 1, 2025

(51) Int. Cl.
G06F 9/24    (2006.01)
G06F 9/4401  (2018.01)

(52) U.S. Cl.
CPC .......... *G06F 9/4401* (2013.01); *G06F 9/4411* (2013.01)

(58) Field of Classification Search
CPC .................................................... G06F 9/4401
USPC .................................................... 713/1
See application file for complete search history.

(56) References Cited

U.S. PATENT DOCUMENTS

| | | | | |
|---|---|---|---|---|
| 8,806,660 B2* | 8/2014 | O'Connor | ............. | G06F 21/123 713/1 |
| 11,763,004 B1* | 9/2023 | Davis | ............. | G06F 21/566 726/24 |
| 2004/0031030 A1* | 2/2004 | Kidder | ............. | H04L 41/22 717/172 |
| 2006/0064488 A1* | 3/2006 | Ebert | ............. | H04L 63/08 709/225 |
| 2008/0092235 A1* | 4/2008 | Comlekoglu | ............. | G06F 11/326 713/176 |
| 2008/0163383 A1* | 7/2008 | Kumar | ............. | G06F 21/57 726/29 |
| 2011/0131447 A1* | 6/2011 | Prakash | ............. | G06F 9/4408 713/189 |
| 2012/0159440 A1* | 6/2012 | Burghard | ............. | G06F 8/71 717/121 |
| 2013/0227516 A1* | 8/2013 | Kriegsman | ............. | G06F 11/3668 717/101 |
| 2017/0155514 A1* | 6/2017 | Schulz | ............. | G06F 21/57 |
| 2021/0004466 A1* | 1/2021 | Nadarajah | ............. | G06F 21/572 |
| 2022/0200787 A1* | 6/2022 | Kostman | ............. | H04L 9/0618 |
| 2023/0084956 A1* | 3/2023 | Robison | ............. | H04L 9/3236 713/2 |
| 2023/0198775 A1* | 6/2023 | Liu | ............. | G06F 21/575 |
| 2023/0315650 A1* | 10/2023 | Lu | ............. | H04L 9/3265 726/17 |
| 2024/0095315 A1* | 3/2024 | Bartfai-Walcott | .... | G06F 21/107 |

(Continued)

*Primary Examiner* — Volvick Derose
(74) *Attorney, Agent, or Firm* — Quarles & Brady LLP

(57) ABSTRACT

Novel systems and methods for canvas sanitization are provided. In various embodiments, a system and method include: receiving a request to open a web page from a client device; replacing, via an agent, a first function with a second function, the agent being loaded to a browser; loading the web page from a web server to the browser; in response to an attempt to perform the first function on the web page, performing, via the browser, the second function corresponding to the first function to generate a drawing for a predetermined period of time; converting, via the agent, the drawing to an image; and transmitting the image to the client device. Other aspects, embodiments, and features are also claimed and described.

19 Claims, 6 Drawing Sheets

(56) References Cited

U.S. PATENT DOCUMENTS

2024/0184897 A1* 6/2024 Yin .................. G06F 21/602
2024/0345924 A1* 10/2024 Kotary .............. G06F 21/554

* cited by examiner

SYSTEM AND METHOD FOR SOFTWARE STATE MANAGEMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for software state management technology.

BACKGROUND

With the rapid growth of silicon products, developers develop software to utilize the silicon products. However, the software development takes up a large share of product development time. In addition, when the software is upgraded to a new version, the entire silicon product has to be powered off and restarted. This affects the performance of the running silicon product or the hardware. As the demand for silicon products continues to increase, research and development continue to advance silicon related technologies not only to prevent hardware performance degrade with software upgrade, but to advance and enhance the user or developer experience with silicon products.

SUMMARY

In an aspect, a method for software state management comprises: generating a first signature for a first data structure of a software component based on a first script; in response to a cold boot, storing the first signature in a memory; in response to a warm boot, comparing the first signature with a second signature for a second data structure for the software component, the second data structure corresponding to the first data structure; in response to the second signature being different from the first signature, updating the memory of a first state associated with the first signature to correspond to a second state associated with the second signature during the warm boot; and migrating the first state to the second state of the software component during the warm boot.

In some embodiments, the first signature is generated in a first offline phase prior to the cold boot, and the second signature is generated in a second offline phase between the cold boot and the warm boot.

According to some embodiments, the method further comprises: generating the second signature for the second data structure of the software component based on a second script, the second script being updated from the first script.

In some examples, the first signature comprises: a first value representing the first data structure of the software component.

According to some embodiments, the first data structure comprises a first data field, and the first signature is generated based on at least one of: a structure name of the first data structure, a field name of the first data field, a data type of the first data field, or a size of the first data field.

According to some embodiments, the first signature for the first data structure is included in a tuple in a database, and the tuple comprises: the first signature and a structure identifier of the first data structure.

According to some embodiments, the method further comprises: generating a data field identifier for the first data field to identify a location of the first data field in the memory According to some embodiments, the method further comprises: storing a report for the first state in the memory, wherein the report comprises at least one of: a structure identifier for the first data structure, a memory block identifier for the first data structure, an offset location of the first data structure, a number of data structure instances of the first data structure, and a size of the data structure instances.

According to some embodiments, the second signature comprises: a second value representing a second data structure of the software component.

According to some embodiments, the comparing of the first signature and the second signature comprises: comparing the first value with the second value. Also, the updating of the memory comprises: in response to a difference between the first value and the second value, assigning a memory space corresponding to a second size of the second data structure in the memory from an offset location of the first state in the memory. Further, the migrating of content of the first state to the second state comprises: migrating the content in the first data structure to the updated memory space.

According to some embodiments, the first data structure comprises a first data field, and the second data structure comprises the first data field and a new data field. In such embodiments, the updating of the memory comprises: determining a new offset location in the memory; and assigning a memory space corresponding to a new size of the second data structure in the memory from the new offset location in the memory. Also, the migrating of the first state to the second state comprises: migrating content in the first data field for the first state to the memory space.

According to some embodiments, the method further comprises: in response to a first size of the first data field being smaller than a second size of the second data field, providing a message indicating a possible loss of content in the first state during the second offline phase.

According to some embodiments, the method further comprises: determining a first version associated with the first state of the software component; determining a second version associated with the second state of the software component; and applying a fix-up function being associated with the second version to fix a bug in the first version before starting the second version of the software component.

In a further aspect, a system for software state management comprises: a memory storing an in-service software upgrade (ISSU) component and a software component; and a processor coupled to the memory. In some embodiments, the processor coupled to the memory is configured to: generate a first signature for a first data structure of a software component based on a first script; in response to a cold boot, store the first signature in a memory; in response to a warm boot, compare the first signature with a second signature for a second data structure for the software component, the second data structure corresponding to the first data structure; in response to the second signature being different from the first signature, update the memory of a first state associated with the first signature to correspond to a second state associated with the second signature during the warm boot; and migrate the first state to the second state of the software component during the warm boot.

In some embodiments, the first signature comprises: a first value representing the first data structure for the first state of the software component.

According to some embodiments, the first data structure comprises a first data field, and the first signature is generated based on at least one of: a structure name of the first data structure, a field name of the first data field, a data type of the first data field, or a size of the first data field.

According to some embodiments, the first signature for the first data structure is included in a tuple in a database, and the tuple comprises: the first signature and a structure identifier of the first data structure.

According to some embodiments, the second signature comprises: a second value representing the second data structure of the software component. To compare the first signature and the second signature, the processor is configured to compare the first value with the second value. To update the memory, the processor is configured to assign a memory space corresponding to a second size of the second data structure in the memory for the second state from an offset location of the first state in the memory in response to a difference between the first value and the second value. To migrate the first state to the second state, the processor is configured to migrate content in the first data structure to the updated memory space.

According to some embodiments, the second signature comprises: a second value representing the second data structure of the software component, and the first data structure comprises a first data field, and wherein the second data structure comprises the first data field and a new data field. To update the memory, the processor is configured to: determine a new offset location in the memory; and assign a memory space corresponding to a new size of the second data structure for the second state in the memory from the new offset location in the memory. To migrate the first state to the second state, the processor is configured to migrate content in the first data field for the first state to the memory space.

In a further aspect, a method for software state management comprises: generating a first signature for a first data structure of a software component based on a first script during a build phase; storing the first signature in a memory during a cold boot; generating a second signature for a second data structure of the software component based on a second script, the second script being updated from the first script during an offline phase; comparing the first signature with the second signature for a second data structure for the software component during a warm boot, the second data structure corresponding to the first data structure; in response to the second signature being different from the first signature, updating the memory of a first state associated with the first signature to correspond to a second state associated with the second signature during the warm boot; and migrating the first state to the second state of the software component during the warm boot.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
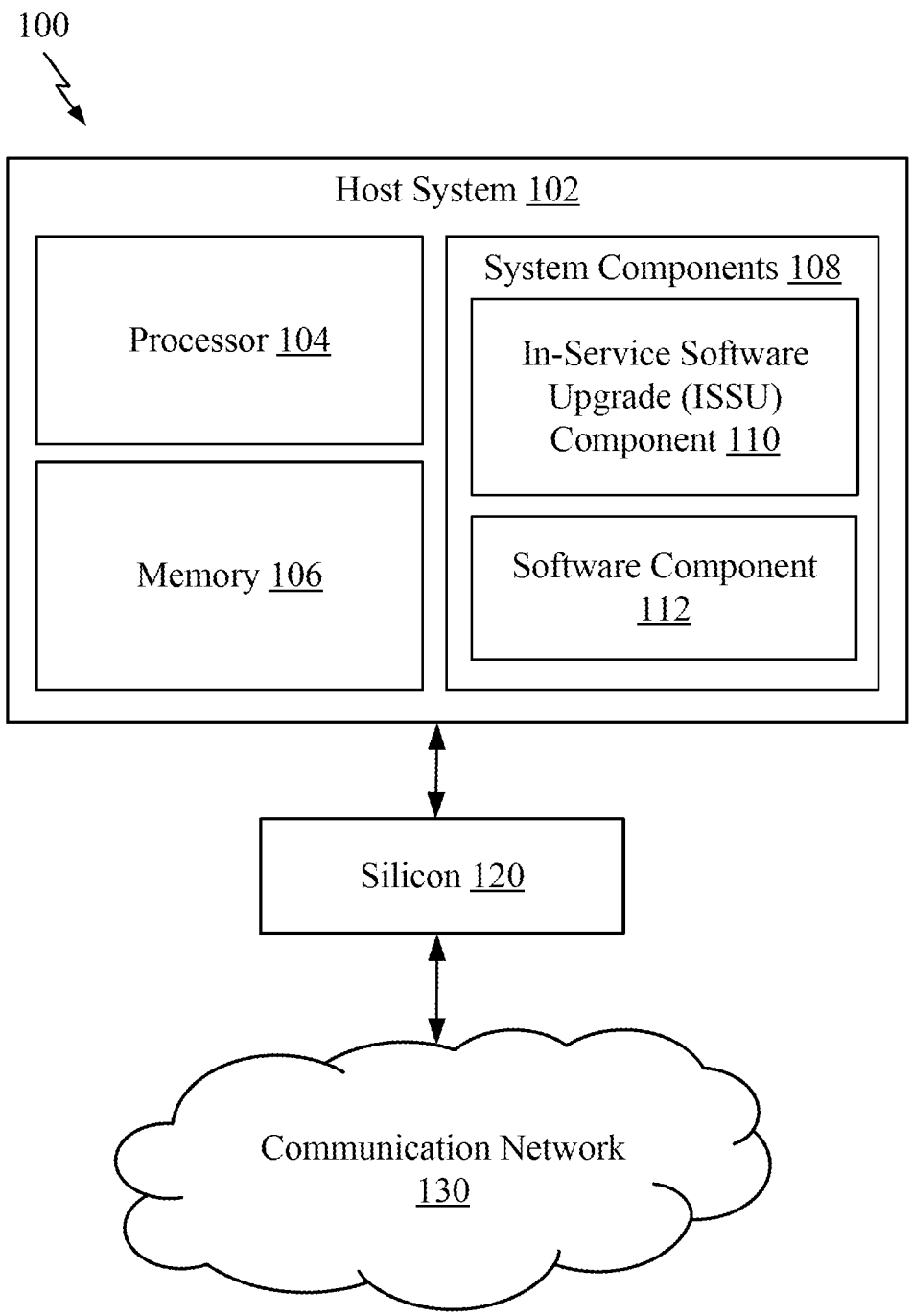
FIG. 1 illustrates an example computing environment for software state management, in accordance with various embodiments.

The disclosed technology will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

As described above, when the software is upgraded to a new version, the entire silicon product has to be powered off and restarted. For example, the silicon product can include a networking chip. The software can be applied to the networking chip to process a task associated with the networking chip (e.g., initialization, monitor, configuration, communication, update, etc.). In some scenarios, the version of the software can be upgraded. During the upgrade, a state of the software can change such that a data structure of data field(s) for a software component of the software changes. For example, a data field of the software component before the software upgrade is a four-byte integer data type while the data field is updated to an eight-byte long data type. In such examples, the software might misinterpret its own state (by referring to four bytes as eight bytes field) which may lead to misconfiguration of the chip. At the same time, existing chips cannot forward packets during the cold boot. Accordingly, a system and method may be desirable to manage the status of software and continue forward packets or operate without the cold boot of the silicon products with software.

Some embodiments described herein provide solutions to these problems by managing the state of software using a warm boot without impacting the performance of the silicon hardware. This enables the silicon to continue to operate when the software is upgraded. In addition, some embodiments described herein manages the state of the software in a lower layer of the software stack. Thus, a lower layer in the software stack only knows the changes of the state while other layers do not know and do not need to know the state change of the software. Further, some embodiments described herein facilitate near real-time interactions between the software and the silicon or chip without or with minimal latency because the previous state of the software is being kept in memory mapped memory. In addition, the user or developer for the software using some embodiments described herein does not need to develop separate software to maintain the state migration of the software (e.g., reassigning a memory space for the state change, migrating the old state to the new state, etc.) because the system and method described herein automatically maintain the migration of the state of the software. Finally, the improved system and method for software state management also provide various other aspects described herein.

FIG. 1 illustrates an example computing environment 100 for software state management, in accordance with various embodiments. In the example computing environment 100, a software component 112 may receive a script, which a developer drafted. An in-service software upgrade (ISSU) component 110 coupled with a processor 104 and a memory 106 can obtain the script and parse the script to generate a first signature representing a first data structure of a software component 112. The ISSU component 110 can store the first signature in the memory 106 in response to a cold boot. For example, the term "cold boot" refers to a process of starting a computer from a powered-down state. In some examples, the first signature in the memory 106 can be stored during the cold boot. In other examples, the first signature in the memory 106 can be stored right before or right after the cold boot. The ISSU component 110 can obtain a report based on a function call of the software component 112 and write the first state of the software component 112 to the memory 106. After the software component is upgraded, the ISSU component 110 can obtain an updated script and parse the updated script to generate a second signature representing a second data structure of the software component 112. During the warm boot, the ISSU component 110 can retrieve the first signature from the memory 106 and compare the first signature with the second signature. In response to the second signature being different from the first signature, the ISSU component 110 can update the memory to correspond to the second state and migrate the first state to the second state of the software component 112. Other aspects of the system and method are further described below.

The embodiment shown in FIG. 1 is one example of a computing system environment and is not intended to be limiting. The host system 102 can include a processor 104, the memory 106, and system components 108. In some examples, the system components 108 within the host system 102 can include the in-service software upgrade (ISSU) component 110 and the software component 112 and can be implemented in hardware, firmware, software, or combinations thereof. In some examples, the host system 102 for software state management can include a centric ISSU library, nonvolatile memory that maintains its content from the previous run and the ability to attach a unique ID to each nonvolatile memory block and a system manager. In some examples, the system manage can initialize the software in the following order: nonvolatile memory, ISSU library and s/w components. An example for nonvolatile memory can be a memory mapped shared file.

In some examples, the processor 104 can be implemented as one or more integrated circuits (e.g., a conventional micro-processor or microcontroller). In an example, the processor 104 can control the operation of the host system 102. The processor 104 can include single core and/or multicore (e.g., quad core, hexa-core, octo-core, ten-core, etc.) processors and processor caches. The processor 104 can execute a variety of resident software processes embodied in program code, and may maintain multiple concurrently executing programs or processes. In some examples, the processor 104 may include a specialized processor, (e.g., digital signal processor (DSP), outboard, graphics application-specific, and/or other processor).

In some examples, a bus subsystem (not shown in FIG. 1) provides a mechanism for intended communication between the various components in the host system 102. The bus subsystem can utilize a single bus or multiple buses. In some examples, the bus subsystem may include a memory bus, memory controller, peripheral bus, and/or local bus using any of a variety of bus architectures (e.g., Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Figure 2:
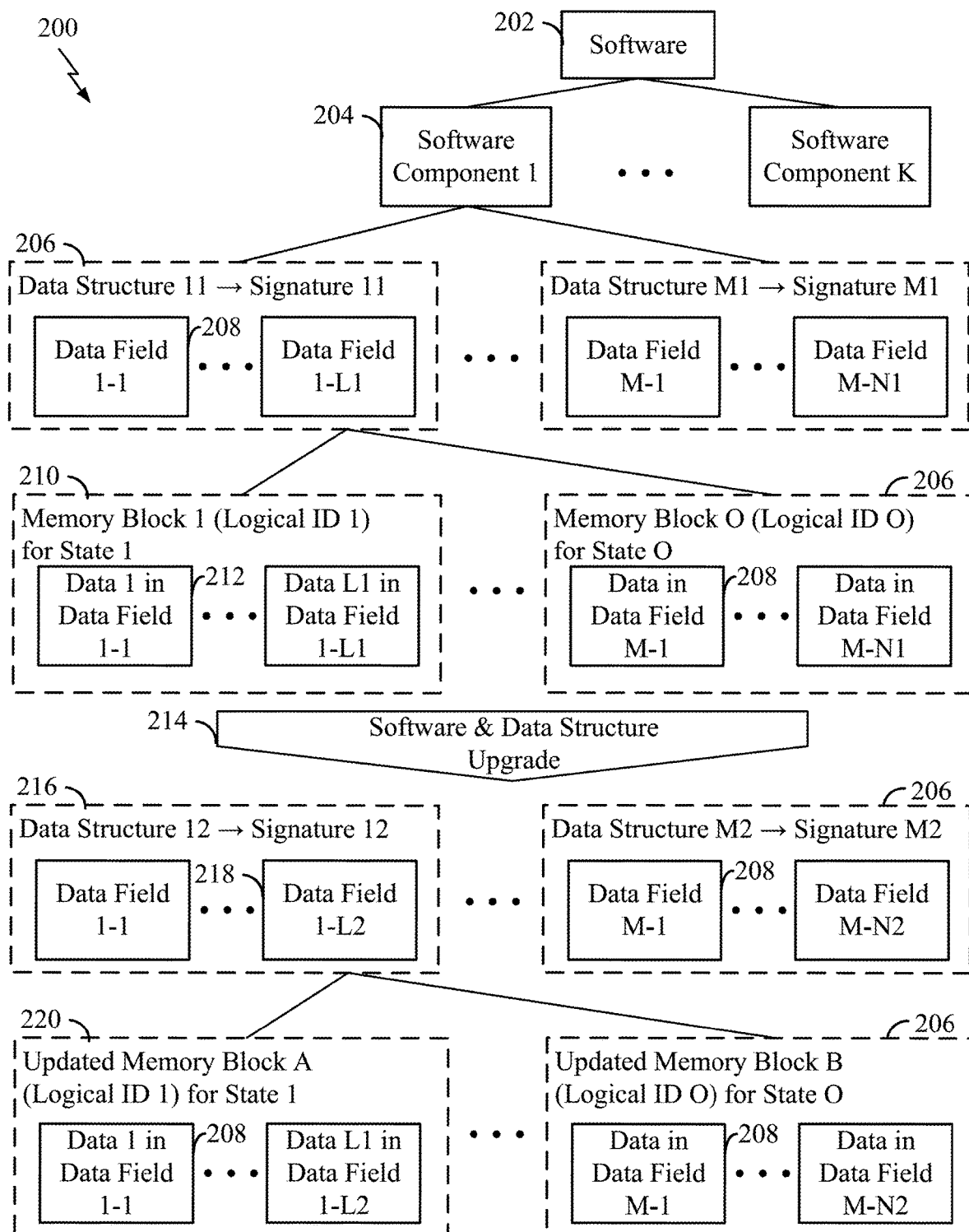
FIG. 2 is a schematic diagram illustrating software state management, in accordance with various embodiments.

In some examples, the memory 106, which is a non-transitory storage medium, can include any suitable storage device or devices that can be used to store suitable data (e.g., the ISSU component 110, the software component 112, etc.) and instructions that can be used, for example, by the processor 104 to execute at least a portion of process 200 described below in connection with FIG. 2. The memory 106 can include any suitable volatile memory, non-volatile memory, storage, or any suitable combination thereof. For example, memory 120 can include random access memory (RAM), read-only memory (ROM), electronically-erasable programmable read-only memory (EEPROM), one or more flash drives, one or more hard disks, one or more solid state drives, one or more optical drives, etc.

In some examples, the ISSU component 110 of the system components 108 can include software stored in the non-volatile memory of the memory 106 and operate via the processor 104 and the memory 106. In some examples, the ISSU component 110 may include a software driver or a software interface to control hardware (e.g., the memory, etc.) and communicate with the software component 112. For example, the ISSU component 110 can access the memory 106 to store or retrieve a state of the software component 112, assign or reassign a memory space for a state of the software component 112, and/or maintain or update the state of the software component 112 in the memory 106. In further examples, the ISSU component 110 may be part of or be utilized by a software development kit for developers to use to build the software component 112 for the silicon 120. In even further examples, the ISSU component 110 may include a software library including non-volatile software resources, which can be used for software development. In some scenarios, the software library may also include other software development tools for the software component 112 to control the silicon 120 (e.g., forwarding or routing packets or any other suitable tasks to be performed by the silicon 120). Although the specification or configuration of hardware (e.g., memory 106) changes, the ISSU component 110 can provide a uniform interface the developers can use to control the hardware state. Thus, the developers of the software component 112 do not need to know the specification or configuration change of the hardware state.

In some examples, the software component 112 of the system components 108 can be stored in the memory 106 as a software application or part of a software application to control the silicon 120 via the processor 104. Referring to FIG. 2, the host system 102 can include software 202 to control or communicate with the silicon 120. In some examples, the software 202 can include multiple software components 204 (e.g., Software Component 1, Software Component K) where each software component 202 can perform a certain task. For example, the software 202 can control the silicon to route or switch packets to a destination device or system. In such example, the software 202 can include a first software component 204 to display the routing status of packets, a second software component 204 to receive and modulate the packets to route, a third software component 204 to control a switch of the silicon 120, and/or any other suitable software component 204 to perform a suitable task associated with the silicon 120. However, it should be appreciated that the software 202 can perform any other suitable task. In some scenarios, the software component 112 in FIG. 1 can be equivalent to the software 202 or the software component 204 in FIG. 2.

In some examples, the software component 204 can include a data structure 206 (e.g., one or more data structures). In some examples, data structures can be applicable to enumerate type definitions. In some examples, the data structure 206 can include a data field 208 (i.e., one or more data fields). In some examples, the data field 208 can include an identifier, a field name, a data type (e.g., an integer, a character, a floating point, a double floating point, a long double point, a function, an array, a pointer, a reference, a class, a structure, an enumerator, a nested datatype, etc.), and/or a size of the data type (e.g., an array of the data type). For example, the data structure 206 may be a structure, or a class, which can be substantiated or embodied with data as a state (i.e., one or more states for the data structure 206). In some examples, a state can use to be defined with the data structure and can be characterized by the content or the data. Thus, a data structure 206 can be substantiated with multiple states based on different data with the data structure. Each state can reside in a memory block 210 of the memory 106 (e.g., the non-volatile memory). The state can represent the data or content 212 in the data field 208. For example, the memory block 210, which is a physical memory, is in the memory 106. In some examples, the memory block 210 can be associated with a memory block identifier (i.e., logical identifier) to correspond to a state. In some examples, although a new memory block for a state due to a data structure upgrade, the memory block identifier for the state can be the same as the memory block identifier for the previously assigned memory block for the state. Then, the software component 204 can use the same content 212 even if the data structure is upgraded. In some examples, multiple sets states for data structures in a software component can be a component state, and multiple component states can be a software state.

For example, the software 202 can include a port component (i.e., software component 204). The port component can include multiple data structures 206: port data structure and port configuration data structure. The port data structure can have multiple data fields 208: a port identifier data filed, a port speed data filed, and an admin state data filed while port configuration data structure can also include data fields: a counter collection enabled data filed and a mirror enable data filed. The port component can generate and maintain multiple states using the data structures. For example, the port component can generate port state 1 (i.e., state) including data (e.g., port identifier=1, port speed=10Gb, admin-state=up) and port state 2 including data (e.g., port identifier=2, port speed=100Gb, admin-state=up) corresponding to data fields in the port data structure and store port state 1 and port state 2 in memory block 1 and memory block 2 of the memory 106 (e.g., the non-volatile memory), respectively. Also the port component can generate port configuration state 1 (i.e., state) including data (e.g., counter collection enabled=true and mirror enable=false) and store the port configuration state 1 in memory block 3 in the memory 106 (e.g., the non-volatile memory).

In some examples, the software and the software component can be upgraded such that the data structure in the software component is upgraded. During the upgrade 214, a data field 218 (i.e., one or more data fields) of a data structure 206 of the software component 204 can be changed, added, or deleted to form an updated data structure 216 corresponding to the data structure 206. Thus, an updated memory block 220 corresponding to the updated data structure 216 for each state can be assigned. The updated memory block 220 for the state can have the same or a different block size as the memory block 210 before the update 214. In some examples, the updated memory block 220 for the state can have the same offset as or a different offset from the memory block 210 for the state before the upgrade 214. Although the data structure is changed and the memory block 206 (i.e., one or more memory blocks 206) is updated, the updated memory block 220 has the same memory block identifier as the memory block 210 before the upgrade 214. In some examples, when the data structure 206 is upgraded or updated, the memory block size may be the same or changes, yet the memory block identifier remains the same. Thus, the software component can receive the same memory block content before or after the software upgrade when the software component uses the same memory block identifier. In some examples, when the value or content 212 in the data field 208 changes, the state may not change. In other examples, when the value or content 212 in the data field 208 changes the state 206 may change as well.

Referring again to FIG. 1, the system components 108 of the host system 102 can further include the communications subsystem (not shown in FIG. 1) to provide a communication interface between the host system 102 and the silicon 120 via the communication network 130, including wired connections, local area networks (LANs), wide area networks (WANs) (e.g., the Internet), and various wired or wireless telecommunications networks. In some examples, the communications subsystem may include, for example, one or more network interface controllers (NICs), such as Ethernet cards, Asynchronous Transfer Mode NICs, Token Ring NICs, and the like, as well as one or more wireless communications interfaces, such as wireless network interface controllers (WNICs), wireless network adapters, and the like. Additionally, and/or alternatively, the communications subsystem may include one or more modems (telephone, satellite, cable, ISDN), synchronous or asynchronous digital subscriber line (DSL) units, Fire Wire® interfaces, USB® interfaces, and the like. The communications subsystem can also include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

In some examples, the communications subsystem may also receive input communication in the form of structured and/or unstructured data feeds, event streams, event updates, and the like, on behalf of a user who uses the host system. In an example, the communications subsystem may be configured to receive an input (e.g., a mouse click input, a keyboard input, etc.) in real-time from the user and/or other communication services. In some scenarios, the various physical components of the communications subsystem may be detachable components coupled to the server 102 via a computer network (e.g., the communication network 130), a FireWire® bus, or the like, and/or may be physically integrated onto a chip. In some examples, the communications subsystem may be implemented in whole or in part by software.

In some examples, the silicon 120 can include an integrated circuit including a set of electronic circuits on a semiconductor material to perform a task. For example, the silicon 120 can be a networking switching chip to forward or route packets. In such example, the silicon 120 can be communicatively coupled to the host system 102 to forward or route packets to another system or device via the communication network 130. In other examples, the silicon 120 can include multiple integrated circuit chips and/or perform a different task.

In some examples, the host system 102 is connected to or communicatively coupled to a silicon 120 via a communication network. In further examples, the silicon 120 is connected to or communicatively coupled to another system or device via the communication network 130. The communication network 130 can be any type of network known in the art supporting data communications. As non-limiting examples, the communication network 130 can be a local area network (LAN; e.g., Ethernet, Token-Ring, etc.), a wide-area network (e.g., the Internet), an infrared or wireless network, a public switched telephone networks (PSTNs), a virtual network, a wired network, etc. The communication network 130 can use any available protocols, such as, e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Due to the ever-changing nature of chips, computers, and networks, the description of the computing environment 100 depicted in the figure is intended only as a specific example. Many other configurations having more or fewer components than the system depicted in the figure are possible. Based on the disclosure and teachings provided herein, a person of ordinary skill in the art will appreciate other ways and/or methods to implement the various embodiments.

Figure 3:
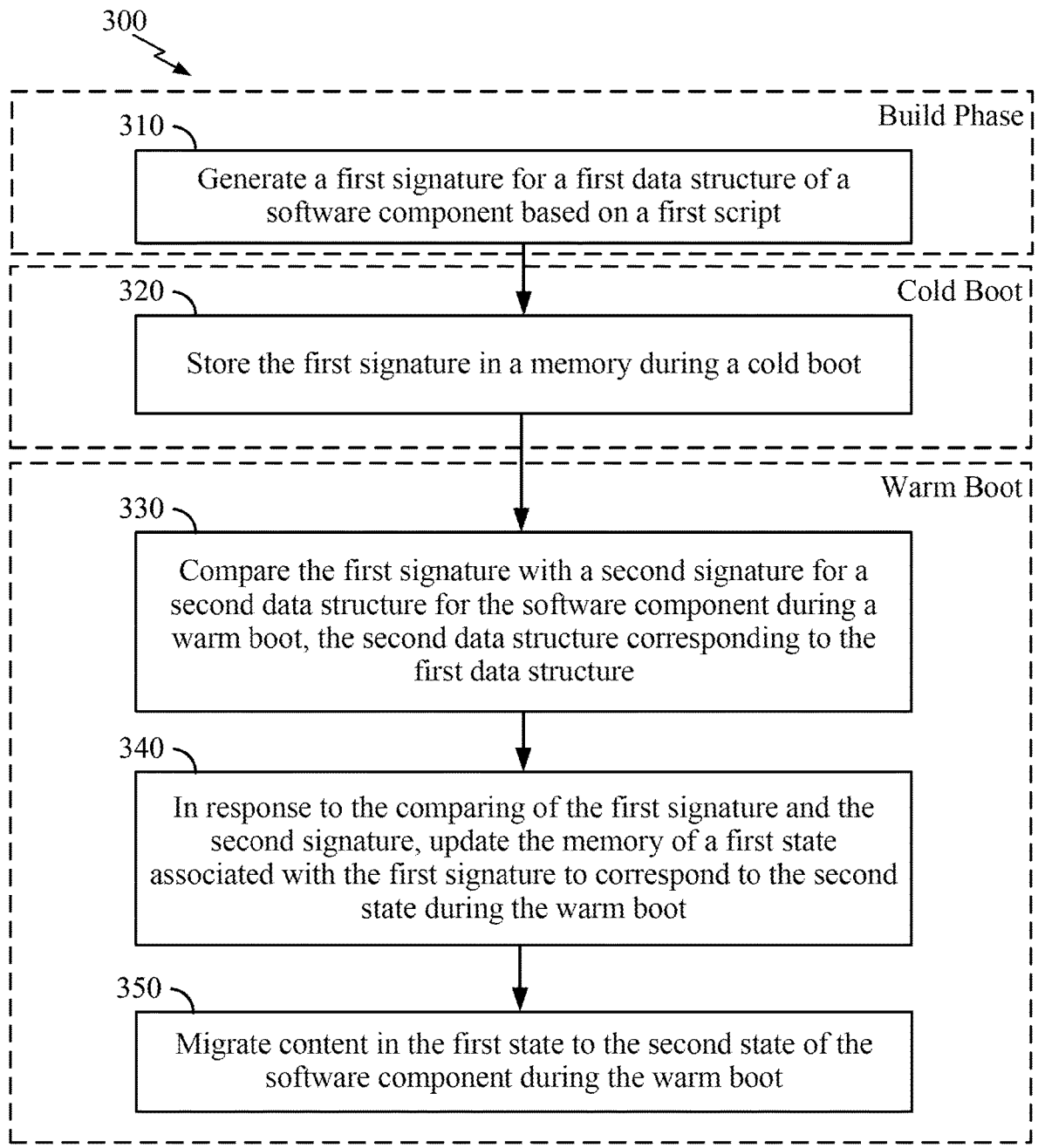
FIG. 3 is a flow chart illustrating an example process for software state management, in accordance with various embodiments.

FIG. 3 is a flow chart illustrating an example process 300 for software state management, in accordance with various embodiments. As described below, a particular implementation can omit some or all illustrated features, and can not require some illustrated features to implement all embodiments. In some examples, the host system 102 with the processor 104 and the memory 106 in FIG. 1 can be configured to carry out the process 200. In further examples, the in-service software upgrade (ISSU) component 110 in FIG. 1 coupled to the processor 104 and the memory 106 can be configured to perform the process 300. In further examples, any suitable apparatus or means for carrying out the functions or algorithm described below may carry out the process 300.

Figure 4:
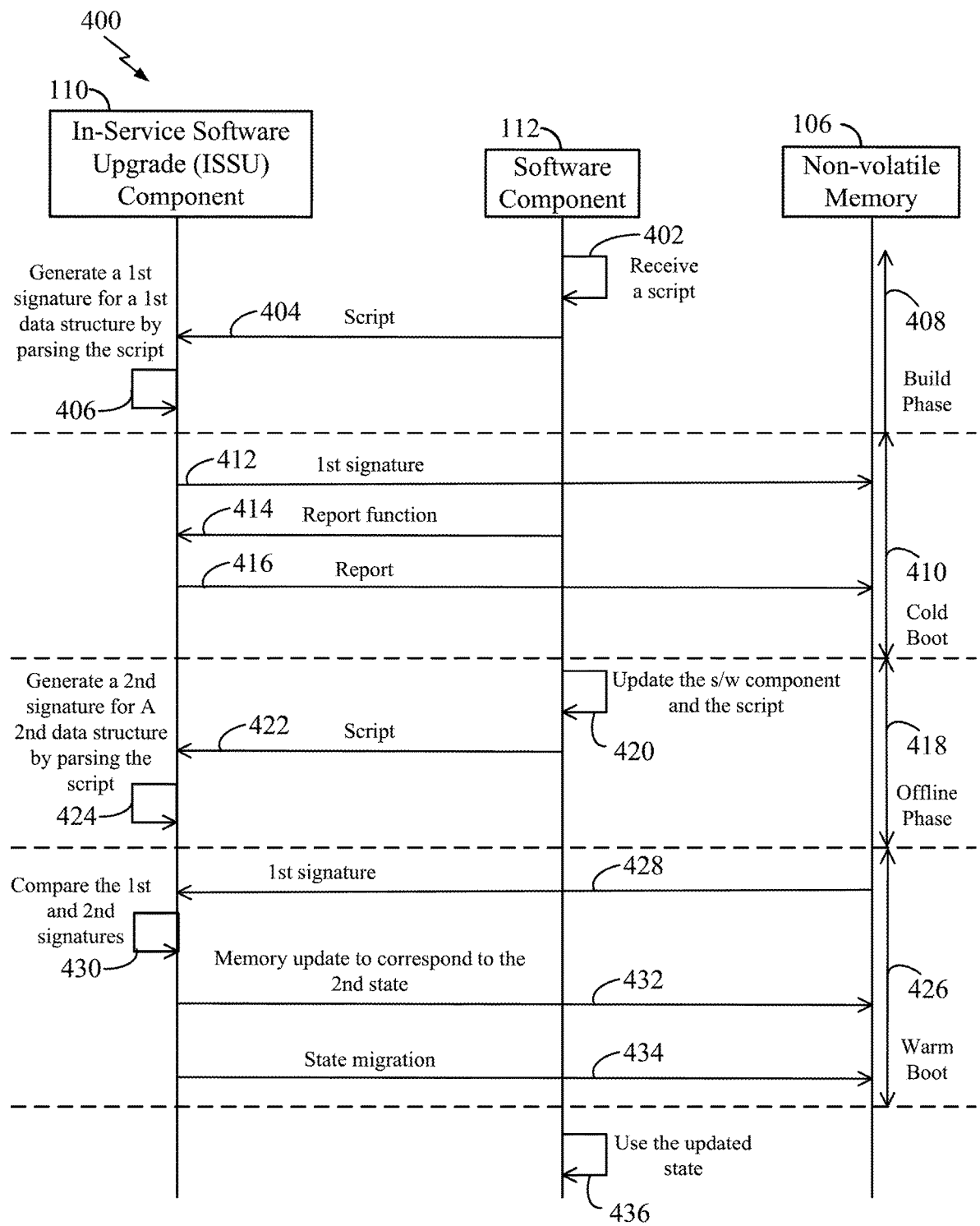
FIG. 4 is a call flow diagram illustrating an example process for software state management, in accordance with various embodiments.

Prior to block 310, the software component 112 can obtain a script as shown at step 402 in FIG. 4. In some examples, the script can include a data serialization language script (e.g., Yet Another Markup Language (YAML), JavaScript Object Notation (JASON), extensible Markup Language (XML), Standard Generalized Markup Language (SGML), or any other suitable language script). In some examples, the script can define a data structure (i.e., one or more data structures), an enumeration type (i.e., one or more enumeration data types) as well as constant types of the software component 112. In some examples, the state can be described using elements that are equivalent to C data types or user-defined data types. In some scenarios, a developer can construct the script to define a state and/or a data structure of the software component 112. In further scenarios, the software component 112 can receive the script from another source via the communication network 130. In other scenarios, the software component 112 can automatically generate, via the processor and the memory 106, the script (e.g., based on other metadata and/or data). The state and the data structure defined in the script can be used in the software component 112 to perform a task (e.g., calculating a value, copying data, pasting data, moving data, converting data in a different format, etc.).

In some examples, the ISSU component 110 can obtain the script (i.e., a first script) at step 404 in FIG. 4. In some examples, the ISSU component 110 can obtain the first script by receiving the first script from the software component 112 or accessing the first script stored in the memory 106. In other examples, the ISSU component 110 can obtain the first script by receiving the first script from any other source communicatively couple to the ISSU component 110.

At block 310, the ISSU component 110 can generate, via the processor 104 and the memory 106, a first signature for a first data structure (e.g., one or more signatures for one or more corresponding data structures of the software component 112) of the software component 112 based on the first script. the first data structure can include a first data field (i.e., one or more data fields). For example, the ISSU component 110 can generate the first signature by parsing the first script. In some examples, block 310 of FIG. 3 can be similar to step 406 in FIG. 4. In some examples, the signature can be a minimum unit to efficiently determine whether the data structure of the software component 110 changes. In some examples, block 310 in FIG. 3 and step 406 in FIG. 4 can be performed in a first offline phase 408 or a software compilation phase prior to a cold boot of the host system 102. In some examples, the first offline phase 408 can indicate a time period during which the software component is compiled or built in the memory 106 (e.g., the non-volatile memory). In some examples, to build the software into a machine executable object during the first offline phase, common and custom tools can be used. For example, the tools can include suitable language compilers and linkers along with ISSU parsers. The combination of the tools can create the software that is being run in the host system 102. In some examples, the tools can also be used in a similar environment as the 100 environment or any other computer-based environment.

Figure 5:
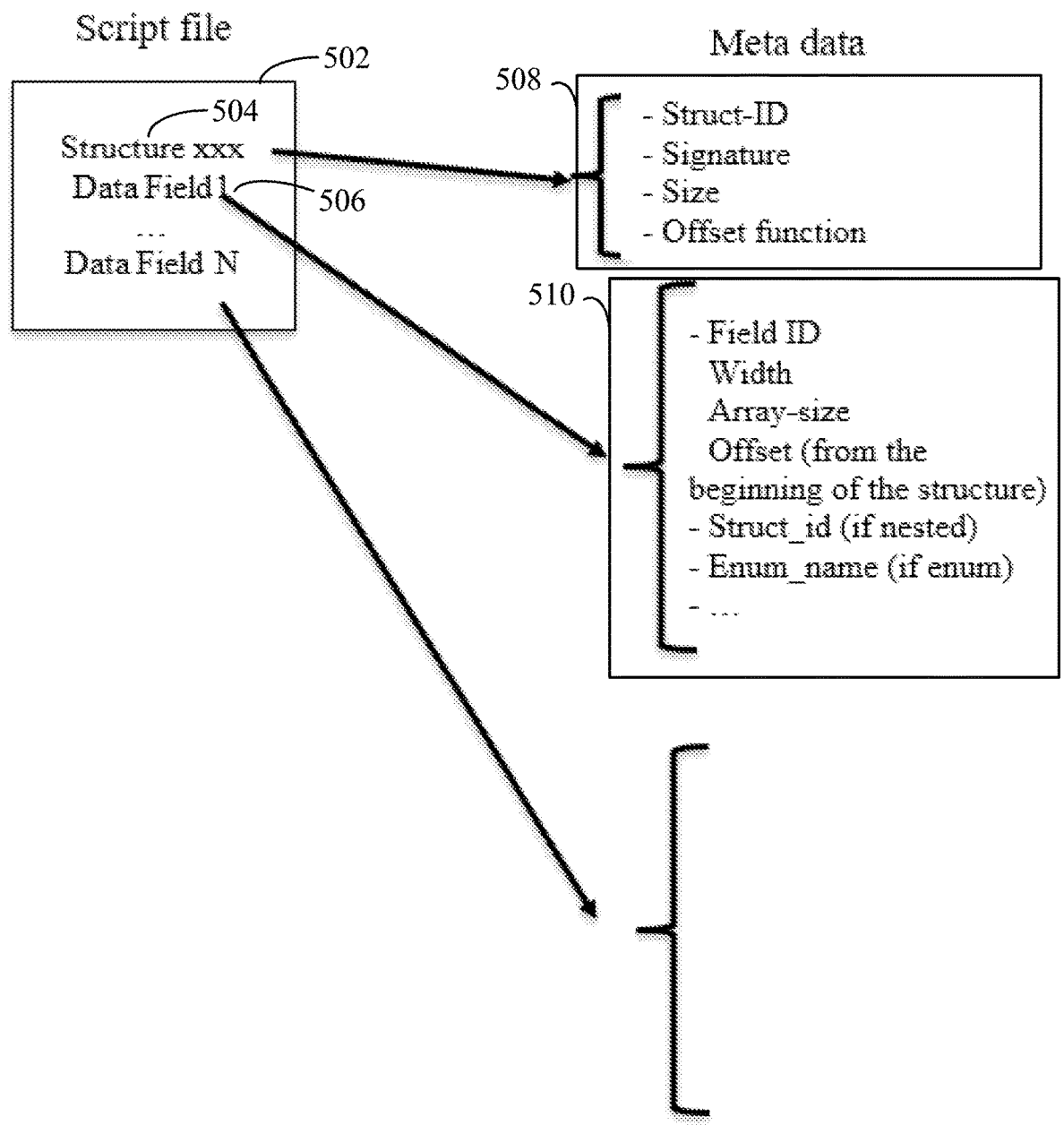
FIG. 5 is a schematic diagram illustrating metadata generated based on a script data, in accordance with various embodiments.
Figure 6:
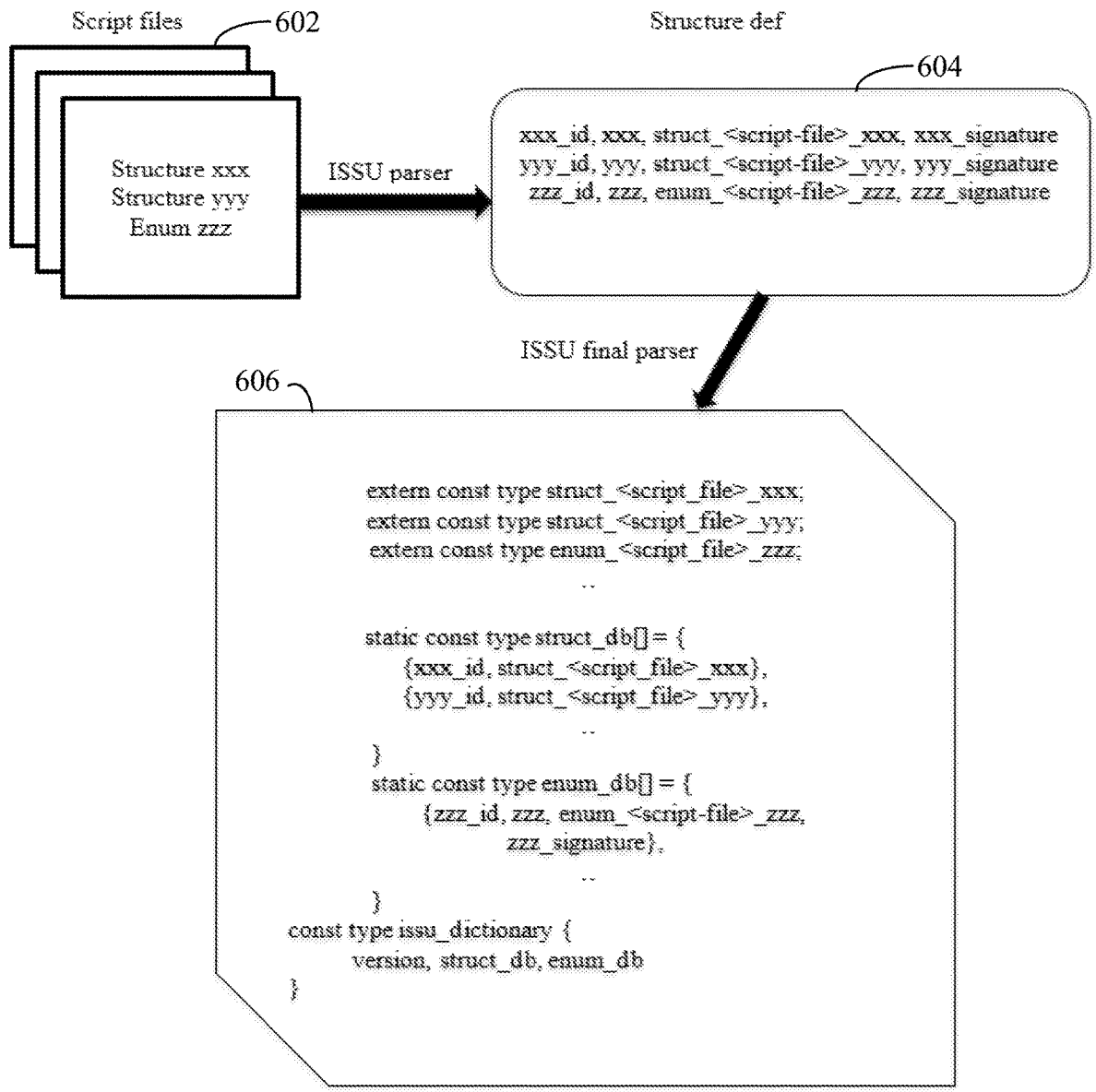
FIG. 6 a schematic diagram illustrating a process to generate a structure identifier and signature database, in accordance with various embodiments.

In some examples, the ISSU component 110 can generate meta data based on the first data structure and a first data field (i.e., one or more data fields in the data structure). In FIG. 5, the ISSU component 110 can generate meta data from the script during a first offline phase 408 or a second offline phase 418. For example, the script 502 (e.g., the first or second script) can define a data structure 506 (i.e., one or more data structures) to include a data field (i.e., one or more data fields in the data structure). The meta data can include structure metadata 508 and data field meta data 510 for each data field. The structure metadata 508 can include at least one of: a structure identifier, a signature, a size, or an offset function. The data field meta data 510 can include at least one of: a field identifier, a width, an array size, an offset from the beginning of the structure, a structure identifier if nested, an enumerator name for an enumeration type of the data field. In should be appreciated that any other metadata for the structure metadata or the data field metadata can be included. In FIG. 6, a process to generate a structure identifier and a signature database is illustrated. For example, the ISSU component 110 (e.g., an ISSU parser) can parse the script 602 to generate structure definitions 604 with structure identifiers and corresponding signatures. Then, the ISSU component 110 (e.g., an ISSU final parser) can generate definitions or functions 606 about how the structure identifiers and signatures can be accessible to the ISSU component 110.

In some examples, the first signature can include a first value (e.g., a 64-bit value or any other suitable sized value) representing a first data structure of a first data structure of the software component 112. In such examples, the ISSU component 112 can generate the first signature based on at least one of: at least one of: a structure name of the first data structure, a field name of the first data field, a data type of the first data field, or a size of the first data field. In further examples, the ISSU component 112 can generate a data field identifier for the first data field (i.e., each data field) to identify a location of the first data field in the memory 106. In such examples, the ISSU component 112 can determine the size of the first data structure from the data type of the first data field (e.g., each data field). For example, when the data type of the first data field is an array data type, the data type may not be enough to determine the size of the first data field. Thus, the first signature can be generated further based on the size of the first data field when the data type is not enough to determine the size of the first data field. In further examples, when the first data field refers to another data field or includes a nested data structure, the nested structure identification can include a signature of the reference data field or a data structure of the reference data field. Thus, the first value of the first signature can effectively represent the first data structure.

In some examples, the first signature can be generated in a separate file or a tuple in a database (e.g., a database file). For example, the database can include multiple tuples or lines for multiple signatures being associated with corresponding data fields. Then, the ISSU component 110 can generate another tuple in the database for the first signature of the first data structure when the ISSU component 110 parses the first script defining the first data structure and/or the first state of the software component 112. In some examples, the tuple can include the first signature and a structure identifier of the first data structure. Thus, while the first signature can capture the definition of the first structure, the structure identifier is unique and remains constant as the structure identifier can be a function of the structure name and the first script containing the structure definition.

In some examples, the ISSU component 110 can generate, via the processor 104 and the memory 106, the first signature and other files (e.g., a header file, source code files, etc.) by parsing the first script. For example, the ISSU component 110 can generate the header file (e.g., a C header file), which contains definitions of data fields (e.g., in the C language). The header file can also include a unique identifier of each data field. In some examples, the ISSU component 110 can further generate the source code files (e.g., C files), which contain metadata that describes the structures (e.g., the offset function, field attributes, etc.) of the data fields. In some examples, the ISSU component 110 might not access the memory 106 to store or retrieve a state or a data structure of the software component 112 during the first offline phase 408. In such examples, the ISSU component 110 can generate the signature for the data structure associated with the first state of the software component 112 and store the signature in a volatile memory (e.g., RAM) of the memory 106. In some examples, the signature may be the same even if a state of the software component 112 changes and the data structure of the software component 112 does not change.

At block 320, the ISSU component 110 can store, via the processor 104 and the memory 106, the first signature in the memory 106 (e.g., a non-volatile memory) during a cold boot. In some examples, block 320 of FIG. 3 can be similar to step 412 in FIG. 4. In some examples, the cold boot 410 may indicate starting the host system 102 including the ISSU component 110 and the software component 112 from a powered-off or powered-down state. For example, after the first offline phase 408, the host system 102 may be turned off and start up from a completely powerless state during the cold boot 410. Thus, the cold boot 410 can remove power and clear volatile memory (e.g., RAM) of internal data that maintains during operations and are created by the ISSU component 110 and/or the software component 112 during the operations. In some examples, the cold boot 410 can indicate that the states of each software component including the software component 112 is empty and initialized (e.g., to 0). For example, with respect to the silicon 120 in FIG. 1, the state of the switch during the cold boot 410 can be disabled. In some examples, the ISSU component 112 can copy the first signature of the first data field and the structure identifier of the first data structure and the metadata of the first data structure into the memory 106 (e.g., non-volatile memory). In such examples, the ISSU component 112 can copy other signatures of other data structure for the software component 110, corresponding structure identifiers, and/or metadata to the non-volatile memory 106. Thus, the ISSU component 110 can copy the data structure dictionaries (e.g., structure identifiers and/or signatures) and/or their corresponding metadata for the software component 110 into the non-volatile memory 106. In some examples, the ISSU component 110 can also store the location of the first state corresponding to the first data structure of the software component 112 in the non-volatile memory. For example, the state may be completely allocated and managed by the software component 112. In some examples, the software component may report the location of a state (i.e. memory ID and offset), the state size and associated the state with a structure ID, thus, the ISSU component 110 may only store the location of the structure associated with the state. In other examples, the ISSU component 110 can just copy the first signature and/or the dictionary in the non-volatile memory and store the location of the first state of the software component 112 when the ISSU component 110 receives a report request and copy the report in the non-volatile memory as shown in steps 414 and 416 in FIG. 4.

In some examples, the ISSU component 110 can receive a report from the software component 112 during the cold boot 410 as shown in step 414 of FIG. 4 and write a report in the non-volatile memory during the cold boot 410 as shown in step 414 of FIG. 4. In some examples, the software component 112 or each software component of the software 202 can provide the report to the ISSU component 110 using the report function. In other examples, the software component 112 can call the report function. In such examples, the ISSU component 110 can place the data structure and/or the first signature of the first data field at a specific non-volatile memory location. Then, the ISSU component 110 can obtain the report by accessing the non-volatile memory. In some examples, the report can include at least one of: a structure identifier for the first data structure, a memory block identifier for the first data structure, an offset location of the first data structure, a number of data structure instances of the first data structure, a size of the data structure instances, or a size of the first data structure. In further examples, the number of instances of the first data structure can include an array. Data structure instances can be an array of back-to-back data structures. For example each ethernet port in a switch might have a state and the port software component might place the state of all the ports together in an array. The port software component can use the port index as the index of this array. In some examples, field instances can be used to refer to array of fields of the same type (and name). Thus, the presence of a field array can impact the offset of all the fields after it.

In some examples, the ISSU component 110 can write the report or content of the report into the memory 106 (e.g., a self-managed non-volatile memory) as shown in step 416 in FIG. 4. In some examples, the self-managed non-volatile memory may indicate a non-volatile memory space of the memory 106 to be used and managed by the ISSU component 110. In some examples, the ISSU component 110 can write the location (block ID and offset) of the first state of the software component 112 in the memory 106 (e.g., the non-volatile memory). The first state can include data or content using the first data structure. Thus, multiple states having different data or content can exist using the same first data structure. In some examples, the first signature for the first data structure can be the same for multiple states associated with the same data structure because the first signature represents structural definitions of all data fields in the first data structure.

In some examples, a second offline phase 418 may exist between the cold boot 410 and a warm boot 426 and can indicate a time period during which the software component 112 is upgraded. For example, the term "warm boot", also known, refers to a soft boot or software reboot process to restart a software or a computer without powering it off completely. For example, during the second offline phase 418, the script and the software component 112 can be upgraded or updated as shown in step 420 in FIG. 4. For example, the script defining the data structure of the software component 112 can be updated such that a data field of the data structure in the script can be updated and/or a new data field can be added in the data structure. In some examples, the ISSU component 110 can obtain a second script, which is updated from the first script as shown in step 422 in FIG. 4. During the second offline phase 418, the ISSU component 110 can generate, via the processor 104 and the memory 106, a second signature for a second data structure of the software component 112 based on a second script, which is updated from the first script as shown in step 424 in FIG. 4. The second data structure can correspond to the first data structure. For example, the second data structure can be a upgraded or updated data structure of the first data structure. In some examples, the structural identifier of the first data structure is the same as the structural identifier of the second data structure while the data structures (e.g., a data type, a data size, etc.) between the first and second data structures can be different. Thus, the second script can be a script to upgrade or update the data structure of the first data field defined in the first script. Also, the second signature can be generated in the second offline phase 418 between the cold boot 410 and the warm boot 426. In some examples, the second signature can include a second value representing a second data structure of the software component. The second signature can be similar to the first signature. In some examples, the second data type of the second data structure can be an upgraded or updated data type from the first data type of the first data structure or a new data type. In some examples, the content or data in the second or upgraded data structure for the software component 112 can represent the second state of the software component 112. In some examples, steps 422 and 424 in FIG. 4 are similar to steps 404 and 406 in FIG. 4. In some examples, the ISSU component 110 can provide a message indicating a possible loss of content in the first state in response to the first size of the first data field being smaller than the second size of the second data field during the second offline phase 418.

At block 330, the ISSU component 110 can compare, via the processor 104 and the memory 106, the first signature with the second signature in response to a warm boot 426. In some examples, the first signature can be compared to the second signature during the warm boot. In other examples, the first signature can be compared to the second signature right before or right after the warm boot. Block 330 is similar to step 430 in FIG. 4. For example, the ISSU component 110 can compare the first value of the first signature with the second value of the second signature. In some examples, the first signature can correspond to the first data structure before the data structure of the software component 112 changes, and the first signature is stored in a non-volatile memory of the memory 406 during the cold boot 410 while the ISSU component 110 can still have the second signature in a volatile memory (e.g., RAM) of the memory 406. Thus, before the block 330, the ISSU component 110 can retrieve, via the processor 104 and the memory 106, the first signature from the memory 106 during a warm boot as shown in step 428 in FIG. 4. In some examples, the warm boot 426 can indicate restarting the host system 102 including the ISSU component 110 and the software component 112 without turning the power of the host system 102 off completely. Thus, the warm boot 426 can restart the already-on host system 102 without completely turning off the host system 102. In some examples, the warm boot 426 can include when the host system 102 is in sleep mode where the host system 102 is not fully turned off. Also, the warm boot 426 may not clear the volatile memory (e.g., RAM) of the memory 106. In the warm boot 426, the state of each software component 112 can hold the content of the same state in the previous software run. For example, during the warm boot 426, the silicon 120 can maintain its exact same state. Unlike the software that is being shut down and up between the cold and warm boot, the silicon 120 can continue to work and may not shut down. Because the warm boot 426 does not clear the volatile memory of the memory 106, the ISSU component 110 can maintain the second signature generated during the second offline phase 418 in the volatile memory and compare the second signature with the first signature, which is stored in the non-volatile memory. Further, the ISSU component activity can be transparent to each software component of the software. For example, the warm boot 410 can be from the same version although the ISSU component 110 may or may not maintain the version of the software component 112. Then, the ISSU component 110 can automatically determine if any state's definition of the software component 112 has changed and automatically update the content of the state to the new definition. Also, the ISSU 110 can determine the state change in real time or near-real time because the ISSU 110 does not compare each data structure between the previous state and the upgraded state but only compares values, which pre-generated to represent data structures for the previous state and the upgraded state.

In some examples, the ISSU component 110 can find the first signature in the non-volatile memory based on the structure identifier associated with the second signature. For example, when the second signature of the second data field is an upgraded or updated signature from the first signature, the second signature can be different from the first signature such that the data type and/or the size of the first data field in the first data structure is different from the data type and/or the size of the corresponding data field in the second data structure. However, the structure identifier associated with the first signature may be the same as the structure identifier associated with the second signature. Thus, based on the same structure identifier, the ISSU component 110 can identify whether the second signature of the second data field corresponds to the first signature of the first data field and the second data field is an updated or upgraded data field from the first data field. In some examples, the ISSU component 110 can search if the identifier for the first signature was reported to the ISSU component 110 (e.g., step 416) by software component 112.

At block 340, the ISSU component 110 can update, via the processor 104 and the memory 106, the memory of the first state (e.g., one or more first states) associated with the first signature to correspond to the second state associated with the second signature during the warm boot in response to the second signature being different from the first signature. For example, the ISSU component 110 can adjust a memory space of the memory (e.g., non-volatile memory) to correspond to the second state (i.e., one or more second states corresponding to the one or more first states) of the software component 112. Thus, the ISSU component 110 can adjust a memory space of the memory to correspond to the size of the second data structure of the software component 112 for the second state. In some examples, the ISSU component 110 can determine that the second signature is different from the first signature when the first value of the first signature is different from the second value of the second signature. For example, the first signature of the first data structure reflects a short integer data type and a 2-byte size of the first data field of the first data structure. When the software component 112 is upgraded, the first data field is upgraded to the second data field having the long integer data type and a 4-byte size. Then, the second signature for the second data structure reflects the upgraded or second data field of the second data structure and has a different signature value from the signature value of the first signature. In the example, the ISSU component 110 can determine that the first signature of the first data field is different from the second signature of the second data field due to the different values of the first and second signatures.

In some examples, the second data structure can correspond to the first data structure. That is, the second data structure can include a data field, which is updated from the first data field of the first data structure. In such examples, to update the memory (e.g., non-volatile memory), the ISSU component 110 can assign a memory space corresponding to the second size of the second data structure in the memory for the second state from an offset location of the first state in the memory in response to a difference between the first data size and the second data size. In some examples, the ISSU component 110 may not assign the memory space from the offset location of the first data field in the memory (e.g., due to other existing data in the expanded memory space or any other suitable reason). In such examples, to update the memory (e.g., non-volatile memory), the ISSU component 110 can determine a new offset location in the memory and assign a memory space corresponding to the second size in the memory for the second state from the new offset location in the memory. In other examples, the second data structure can include a new data field in the second state. In such examples, to update the memory (e.g., non-volatile memory), the ISSU component 110 can determine a new offset location in the memory and assign a new size of the second data structure for the second state in the memory from the new offset location in the memory. In some examples, if the ISSU component 110 obtains the report containing the identifier for the first signature (e.g., during the cold boot 410), the ISSU component 110 can update the data structure corresponding to the identifier in the non-volatile memory to its current definition while retaining the content of the data field.

At block 350, the ISSU component 110 can migrate, via the processor 104 and the memory 106, the first state to the second state of the software component 112 during the warm boot. In some examples, the first state can include content or data of the first data structure of the software component 112. In some examples, migrating the content in the first state to the second state can include copying, moving, or converting content in the first data field (e.g., all data fields) of the first data structure for the first state to the second data field (e.g., all data fields) of the second data structure for the second state. In the examples assigning memory space corresponding to the second size of the second data structure in the memory from an offset location of the first state in the memory, the migrating of the content in the first state can include migrating the content in the first data field (e.g., all data fields) of the first data structure to the memory space, which overlaps the memory space for the first data field. In other examples assigning the memory space corresponding to a new size of the second data structure in the memory from the new offset location in the memory, the migrating of the content in the first state can include migrating the content in the first data field (e.g., all data fields) of the first data structure to the memory space, which is newly assigned. In some examples, migrating the value of an enumerate typed field may maintain the logical value associated with the enumerated type string even if the definition of the enumerated type has changed between the first and second version of the script file. In further examples, migrating the value of a pointer types fields may maintain the field pointing to the exact same location of the structure it is pointing to. In this context, a pointer value may include the memory block ID and an offset.

In some examples, the software component 112 can operate during the warm boot 426 and after the warm boot, the software component 112 can use the second state, which is upgraded from the first state without knowing the change of the state for the software component 112 as shown in step 436 in FIG. 4.

In some examples, during the lifecycle of the software component, some changes might not be supported by the ISSU component 110. The changes can be to fix a bug or hardware update that is impacting the ISSU component's functionality. For the purpose, the ISSU component 110 can provide a mechanism to apply a fix-up function, which is associated with a particular version of the software component 112, device, or variant. In some examples, a version of the software component 112 can reflects an indication of a state of the software component 112 and a time of generation or upgrade of the software component 112. For example, the version can include a number where a higher number indicate a more recent upgrade or generation of the software component 112 than a lower number. Thus, the fix-up function can allow the software component owner to repair some state related bugs as a new software, in which the bug had been fixed, is starting to run.

In some examples, the ISSU component 110 can determine a first version associated with the first state of the software component 112 and a second version associated with the second state of the software component 112. Then, the ISSU component 110 can apply a fix-up function being associated with the second version to fix a bug in the first version before starting the second version of the software component 112. In some examples, each fix-up function patch can be associated with a unique identifier. The identifier can be generated by a dedicated script. The ISSU component 110 can provide a script where a developer can obtain the unique identifier for the fix-up function. Once an identifier for the fix-up function has been established, the developer can add the fix-up function to a version of the software component 112. To do that, the developer can invoke another script that can register the fix-up function within the specific version. The developer can provide the fix-up function name, its handler and the (generated) fix-up function identifier. The developer can also provide a device identifier and a variant to restrict the fix-up function for the specific device and/or variant. The fix-up functions can be executed to be determined by the version the fix-up functions are associated with, so fix-up functions associated with older version can execute before patches that are associated with a newer version. In some examples, the developer can generate a fix-up function by generating a fix-up function identifier, inserting a fix-up function in the ISSU database, and writing the fix-up function. In some examples, multiple fix-up functions having dependencies exist for the same version and can be executed in some order. To control the execution order of fix-up functions belong to the same version, a priority flag to determine the order of the fix-up functions can be used when the fix-up functions are inserted in the ISSU database.

In other examples, the fix-up function can be used for a state change of the software component 112. For example, during the second offline phase 418, a new state for another software component can be generated. In such examples, the new state may not be not reported to the ISSU component during the cold boot 410. Thus, the software component can use the fix-up function to report its new state to the ISSU component. However, it should be appreciated that the fix-up function is not limited to the use cases described above.

While particular features and aspects have been described with respect to some embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while particular functionality is ascribed to particular system components, unless the context dictates otherwise, this functionality need not be limited to such and can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—particular features for ease of description and to illustrate some aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A method for software state management, comprising:
generating a first signature for a first data structure of a software component based on a first script;
in response to a cold boot, storing the first signature in a memory;
in response to a warm boot, comparing the first signature with a second signature for a second data structure for the software component, the second data structure corresponding to the first data structure;
generating the second signature for the second data structure of the software component based on a second script, the second script being updated from the first script;
in response to the second signature being different from the first signature, updating the memory of a first state associated with the first signature to correspond to a second state associated with the second signature during the warm boot; and
migrating the first state to the second state of the software component during the warm boot.

2. The method of claim 1, wherein the first signature is generated in a first offline phase prior to the cold boot, and wherein the second signature is generated in a second offline phase between the cold boot and the warm boot.

3. The method of claim 1, wherein the first signature comprises: a first value representing the first data structure of the software component.

4. The method of claim 3, wherein the first data structure comprises a first data field, and
   wherein the first signature is generated based on at least one of: a structure name of the first data structure, a field name of the first data field, a data type of the first data field, or a size of the first data field.

5. The method of claim 4, further comprising:
   generating a data field identifier for the first data field to identify a location of the first data field in the memory.

6. The method of claim 3, wherein the first signature for the first data structure is included in a tuple in a database, and
   wherein the tuple comprises: the first signature and a structure identifier of the first data structure.

7. The method of claim 3, further comprising:
   storing a report for the first data structure in the memory, wherein the report comprises at least one of: a structure identifier for the first data structure, a memory block identifier for the first data structure, an offset location of the first data structure, a size of the first data structure, or a number of structure instances of the first data structure.

8. The method of claim 3, wherein the second signature comprises: a second value representing the second data structure of the software component.

9. The method of claim 8, wherein the comparing of the first signature and the second signature comprises: comparing the first value with the second value,
   wherein the updating of the memory comprises: in response to a difference between the first value and the second value, assigning a memory space corresponding to a second size of the second data structure in the memory for the second state from an offset location of the first state in the memory, and
   wherein the migrating of the first state to the second state comprises: migrating content in the first data structure to the updated memory space.

10. The method of claim 8, wherein the first data structure comprises a first data field, and wherein the second data structure comprises the first data field and a new data field;
    wherein the updating of the memory comprises:
      determining a new offset location in the memory; and
      assigning a memory space corresponding to a new size of the second data structure for the second state in the memory from the new offset location in the memory, and
    wherein the migrating of the first state to the second state comprises: migrating content in the first data field for the first state to the memory space.

11. The method of claim 8, further comprising:
    in response to a first size of the first data field being smaller than a second size of the second data field, providing a message indicating a possible loss of content in the first state during the second offline phase.

12. The method of claim 1, further comprising:
    determining a first version associated with the first state of the software component;
    determining a second version associated with the second state of the software component; and
    applying a fix-up function being associated with the second version to fix a bug in the first version before starting the second version of the software component.

13. A system comprising:
    a memory storing an in-service software upgrade (ISSU) component and a software component; and
    a processor coupled to the memory,
    wherein the processor coupled to the memory is configured to:
      generate a first signature for a first data structure of a software component based on a first script;
      in response to a cold boot, store the first signature in a memory;
      in response to a warm boot, compare the first signature with a second signature for a second data structure for the software component during a warm boot, the second data structure corresponding to the first data structure;
      generate the second signature for the second data structure of the software component based on a second script, the second script being updated from the first script;
      in response to the second signature being different from the first signature, update the memory of a first state associated with the first signature to correspond to a second state associated with the second signature during the warm boot; and
      migrate the first state to the second state of the software component during the warm boot.

14. The system of claim 13, wherein the first signature comprises: a first value representing the first data structure for the first state of the software component.

15. The system of claim 14, wherein the first data structure comprises a first data field, and
    wherein the first signature is generated based on at least one of: a structure name of the first data structure, a field name of the first data field, a data type of the first data field, or a size of the first data field.

16. The system of claim 14, wherein the first signature for the first data structure is included in a tuple in a database, and
    wherein the tuple comprises: the first signature and a structure identifier of the first data structure.

17. The system of claim 14, wherein the second signature comprises: a second value representing the second data structure of the software component,
    wherein to compare the first signature and the second signature, the processor is configured to compare the first value with the second value,
    wherein to update the memory, the processor is configured to assign a memory space corresponding to a second size of the second data structure in the memory for the second state from an offset location of the first state in the memory in response to a difference between the first value and the second value, and
    wherein to migrate the first state to the second state, the processor is configured to migrate content in the first data structure to the updated memory space.

18. The system of claim 14, wherein the second signature comprises: a second value representing the second data structure of the software component,
    wherein the first data structure comprises a first data field, and wherein the second data structure comprises the first data field and a new data field;
    wherein to update the memory, the processor is configured to:
      determine a new offset location in the memory; and
      assign a memory space corresponding to a new size of the second data structure for the second state in the memory from the new offset location in the memory, and
    wherein to migrate the first state to the second state, the processor is configured to migrate content in the first data field for the first state to the memory space.

19. A method for software state management, comprising:
generating a first signature for a first data structure of a software component based on a first script during a first offline phase;
storing the first signature in a memory during a cold boot;
generating a second signature for a second data structure of the software component based on a second script, the second script being updated from the first script during a second offline phase;
comparing the first signature with the second signature for a second data structure for the software component during a warm boot, the second data structure corresponding to the first data structure;
in response to the second signature being different from the first signature, updating the memory of a first state associated with the first signature to correspond to a second state associated with the second signature during the warm boot; and migrating the first state to the second state of the software component during the warm boot.

* * * * *